(12) United States Patent
Weizman et al.

(10) Patent No.: US 8,430,562 B2
(45) Date of Patent: Apr. 30, 2013

(54) DEVICE AND METHOD FOR EVALUATING A TEMPERATURE

(75) Inventors: Yoav Weizman, Kfar Vitkin (IL); Lior Aviv, Hertzelia (IL); Shai Shperber, Bat Hefer (IL)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 13/291,252

(22) Filed: Nov. 8, 2011

(65) Prior Publication Data
US 2012/0051398 A1 Mar. 1, 2012

Related U.S. Application Data

(62) Division of application No. 12/179,839, filed on Jul. 25, 2008, now Pat. No. 8,070,357.

(51) Int. Cl.
*G01K 7/00* (2006.01)

(52) U.S. Cl.
USPC ......................................................... 374/178

(58) Field of Classification Search ................... 374/178
See application file for complete search history.

(56) References Cited

U.S. PATENT DOCUMENTS

| | | | |
|---|---|---|---|
| 6,934,652 B2 | 8/2005 | Gauthier et al. | |
| 7,088,172 B1 | 8/2006 | Lesea et al. | |
| 7,619,486 B1 | 11/2009 | Lesea | |
| 7,772,915 B2 | 8/2010 | Kim | |
| 2004/0013161 A1 | 1/2004 | Kim | |
| 2007/0132493 A1 | 6/2007 | Fujisawa et al. | |
| 2008/0297228 A1 | 12/2008 | Kim | |
| 2009/0153214 A1 | 6/2009 | Takatori | |
| 2010/0141328 A1 | 6/2010 | Meninger et al. | |

OTHER PUBLICATIONS

Chen et al., "A Time-to-Digital-Converter-Based CMOS Smart Temperature Sensor," IEEE Journal of Solid-State Circuits, vol. 40, No. 8, Aug. 2005, pp. 1642-1648.

*Primary Examiner* — Mirellys Jagan

(57) ABSTRACT

A method for evaluating temperature is disclosed. The method includes setting a configuration of a configurable delay line out of multiple possible configurations, and delaying a first input signal by a temperature sensitive delay line, delaying a second input signal by the configurable delay line. The configurable delay line is less sensitive to temperature than the temperature sensitive delay line. The method also includes detecting, by a phase detector, a delay difference between a delay introduced by the temperature sensitive delay line and a delay introduced by the configurable delay line, repeating the setting, delaying of the first input signal, delaying of the second input signal and detecting, until the delay difference is below a threshold, and evaluating the temperature of the temperature sensitive delay line in response to a configuration of the configurable delay line that results in the delay difference that is below the threshold.

20 Claims, 5 Drawing Sheets

22

DEVICE AND METHOD FOR EVALUATING A TEMPERATURE

CROSS-REFERENCE TO RELATED APPLICATION

This application is a divisional of U.S. patent application Ser. No. 12/179,839, entitled "Device and Method for Evaluating a Temperature," filed on Jul. 25, 2008, the entirety of which is herein incorporated by reference.

FIELD OF THE DISCLOSURE

The present invention relates to methods and devices for evaluating a temperature.

BACKGROUND

Modern integrated circuits are expected to operate at very high frequencies and over a large range of temperatures. In order to be able to operate at very high frequencies these integrated circuits are manufactured by highly advanced manufacturing processes that are characterized by relatively significant process condition variations.

These process conditions as well as the temperatures of the device strongly effect the manner in which the integrated circuit acts.

Evaluating the temperature of the integrated circuit can be of use in various types of integrated circuits including but not limited to temperature sensors, temperature compensated circuits and the like.

SUMMARY OF THE INVENTION

The present invention provides a method and a device as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

Further details, aspects, and embodiments of the invention will be described, by way of example only, with reference to the drawings.

DETAILED DESCRIPTION OF THE DRAWINGS

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

In the following specification, the invention will be described with reference to specific examples of embodiments of the invention. It will, however, be evident that various modifications and changes may be made therein without departing from the broader spirit and scope of the invention as set forth in the appended claims.

It has been found that a temperature can be evaluated in response to differences between delays introduced by a temperature sensitive delay line (TSDL) and a configurable delay line (CDL), Both have substantially the same process condition sensitivity but exhibit different temperature sensitivities.

Figure 1:
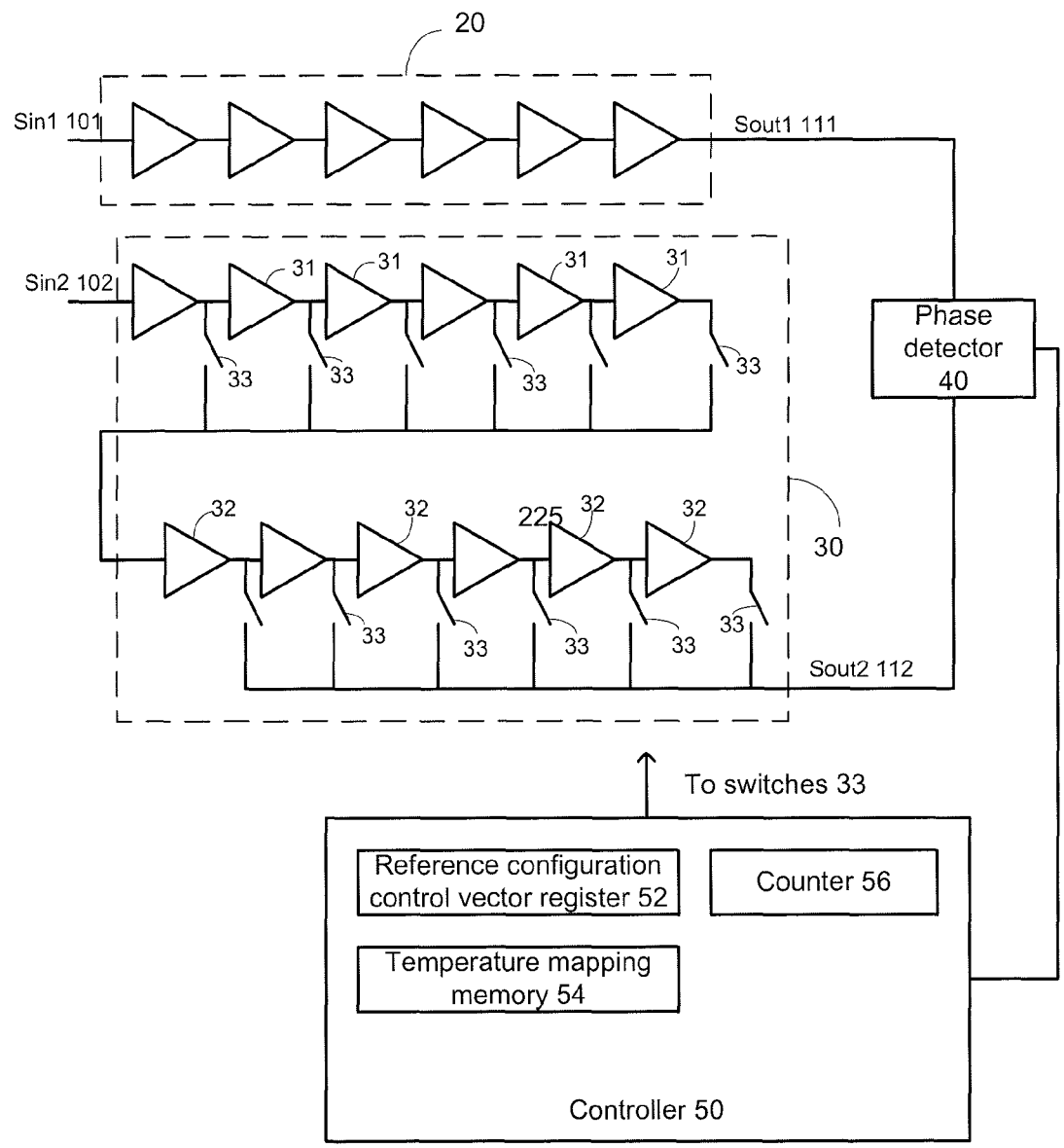
FIG. 1 schematically shows an example of an embodiment of a device that has temperature evaluating capabilities.

FIG. 1 schematically shows an example of an embodiment of device 10 that has temperature evaluating capabilities.

Device 10 includes: (i) temperature sensitive delay line (TSDL) 20; (ii) configurable delay line (CDL) 30; (iii) phase detector 40; and (iv) controller 50. As shown, a temperature sensitive delay line includes CMOS transistor (NMOS transistors and PMOS transistors) of a first type while the configurable delay line includes CMOS transistor (NMOS transistors and PMOS transistors) of a second type.

The process condition sensitivity of the first type CMOS transistors of TSDL 20 substantially equals a process condition sensitivity of the second type CMOS transistors of CDL 30 in this example. Accordingly, the delay introduced by each delay line is responsive at substantially the same manner to process condition variations which may be introduced by the conditions during manufacturing.

CDL 30 may have a different temperature sensitivity than TSDL 20. For example, CDL 30 may be less sensitive to temperature changes than TSDL 20. The difference between the sensitivities of these delay lines can be any suitable value and for example be at least 15%.

TSDL 20 receives a first input signal Sin1 101 and delays it by a first delay period to provide first output signal Sout1 111. The first delay period is responsive to the process conditions that existed during the manufacturing process of TSDL 20 and to the current temperature of TSDL 20.

CDL 30 receives a second input signal Sin2 102 and delays it by a second delay period to provide second output signal Sout2 112. The second delay period is responsive to the process conditions that existed during the manufacturing process of CDL 30 and to the current configuration of CDL 30. Both delay lines 20 and 30 are manufactured under the same (or substantially the same) manufacturing conditions. The first and second type NMOS and PMOS transistors can be located relatively close to each other. The second delay period can also be responsive (though in a different way than the first delay period) to the temperature of CDL 30.

Phase detector 40 is connected to an output of TSDL 20 and to an output of adjustable delay line 30. It receives Sout1 111 and Sout2 112 and determines a difference between a delay introduced by the TSDL and a delay introduced by the adjustable delay line. Using a phase detector without exactly measuring the phase difference (only comparing the delay difference to a threshold) simplifies the processing of the phase difference and contributes to its feasibility—as the exact phase difference should not be measured by using an ultra high frequency counter. Such an ultra high frequency counter should count many cycles within a period that corresponds to the delay difference. In many integrated circuits the implementation of such ultra high frequency counter is not feasible due to maximal frequency limitations.

Controller 50 is connected to phase detector 40 and to CDL 30. Controller 50 is adapted to find a so-called equal delay configuration of CDL 30—the configuration that introduces a second delay that substantially equals the first delay introduced by TSDL 20 and determine a temperature of TSDL 20.

In this example, controller 50 controls the configuration of CDL 30 by sending control signals that determine which delay cells of CDL 30 will participate in delaying Sin2 102 to provide Sout 2 112.

Controller 50 can for example find the equal delay configuration by changing the configuration of CDL 30 (by sending one control word after the other) until the phase difference between the delay lines is insignificant (below a threshold). In this case the first and second delays are regarded as substantially equal.

Controller 50 can for example participate in a calibration process that is conducted at a known temperature. During this calibration process a reference configuration of CDL 30 is found. This reference configuration is the equal delay configuration of CDL 30 at the known temperature.

When device 10 evaluates a temperature of CDL 30 then controller 50 finds (in an iterative manner) the equal delay configuration of CDL 30 and this configuration is compared to the reference configuration of CDL 30.

Differences, if any, between the equal delay configuration to the reference configuration are translated (by controller 50) to temperature differences between the known temperature and the currently evaluated temperature.

Figure 3:
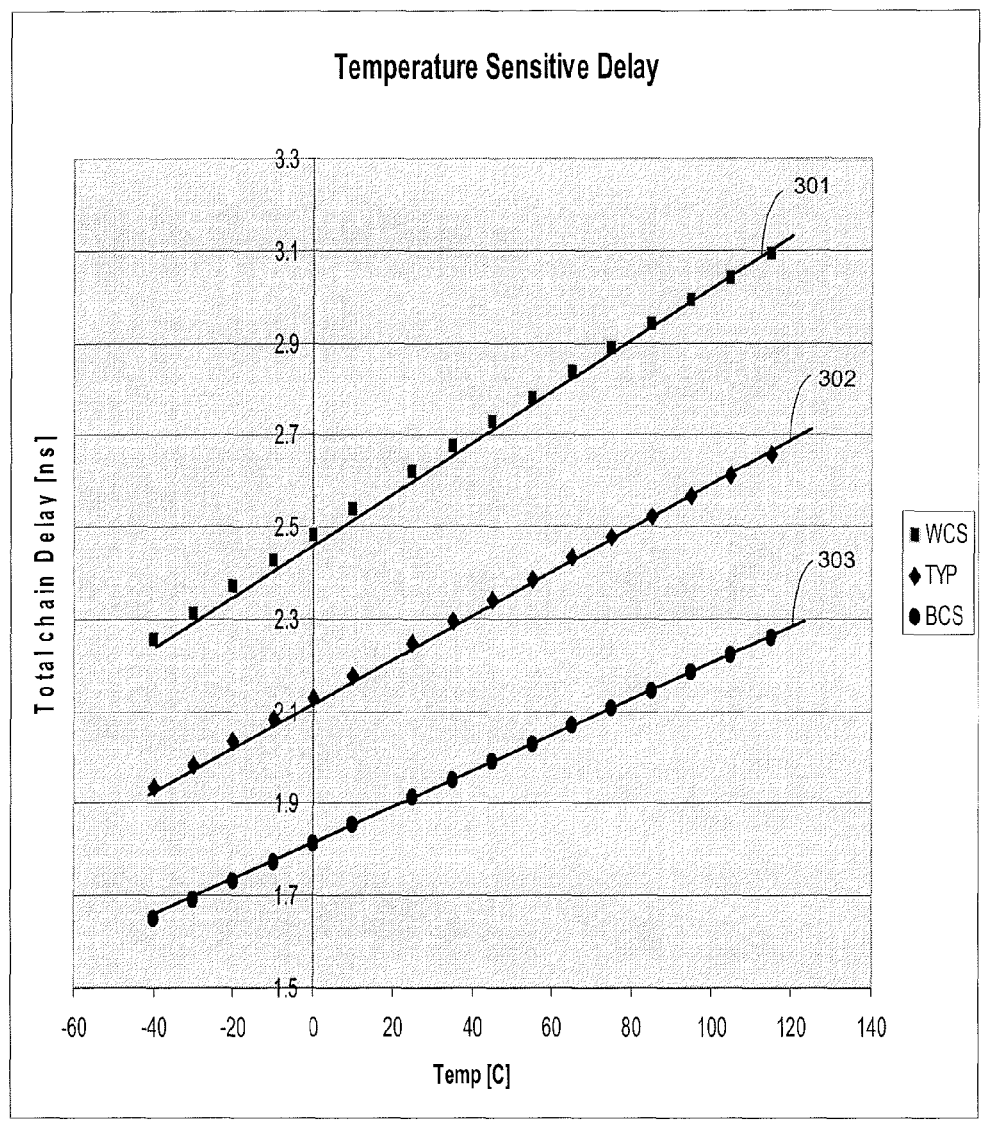
FIG. 3 schematically shows a relationship between delays, temperatures and process conditions.

In the example of FIG. 3 it is illustrated that different process conditions can result in different linear relationships between temperature and delay. Three parallel (yet oriented in relation to the x-axis) curves 301, 302 and 303 illustrate the linear relationships between temperature and delay of temperature sensitive delay lines manufactured under the best process condition (BPC), a typical process condition (TYP) and the worst process condition (WPC) of a process window.

Due to the fact that curves 301, 302 and 303 are substantially parallel to each other there is no need to know the exact process condition as the difference between the configurations of the CDL provides the difference between the known temperature to the evaluated temperature. TSDL 20 may be implemented in any manner suitable for the specific implementation. For example, a temperature sensitive delay line includes CMOS transistor (NMOS transistors and PMOS transistors) of a first type while the configurable delay line includes CMOS transistor (NMOS transistors and PMOS transistors) of a second type. A small temperature sensitive delay line can be obtained by using delay cells that include capacitors and inverters. The time-consuming charge and discharge of the capacitors increases the delay of the each delay cell and reduces the overall number of delay cells.

CDL 30 may be implemented in any manner suitable for the specific implementation. In the example of FIG. 1, CDL 30 includes multiple rough delay cells 31, multiple fine delay cells 32 and switches 33. A rough delay cell 31 introduces a delay that is much longer than the delay introduced by a fine delay element 32. The overall delay introduced by all fine delay cells 32 is shorter than a delay introduced by a single rough delay cell 31. Small configurable delay lines can be obtained by using coarse delay cells and fine delay cells. In addition, the configurable delay line can receive a delayed input signal—so that the overall delay introduced by it can be smaller—resulting in less delay cells.

The delay cells are connected to each other in serial manner. In addition, bypass paths that include switches 33 can bypass one or more delay cells such as to exclude them from affecting the delay introduced by CDL 30.

Switches 33 are controlled by controller 50. Controller 50 can change the configuration of CDL 30 by sending a control word that determines which switches 33 to activate.

First type CMOS transistors of TSDL 20 can be large width CMOS transistors. Each delay cell 22 of TSDL 20 can include an inverter and a capacitor, wherein the inverter charges and discharges the capacitor.

Second type CMOS transistors of CDL 30 can be Dual Gate Oxide (DGO) transistors.

In the example of FIG. 1, controller 50 includes: (i) reference configuration control vector register 52 that stores the control word that caused CDL 30 to be at its reference configuration; (ii) temperature mapping memory 54 that stores the mapping between configuration changes and temperature changes. It can include curves or a function; and (iii) counter 56 that changes the control word in order to check one configuration after the other.

Figure 2:
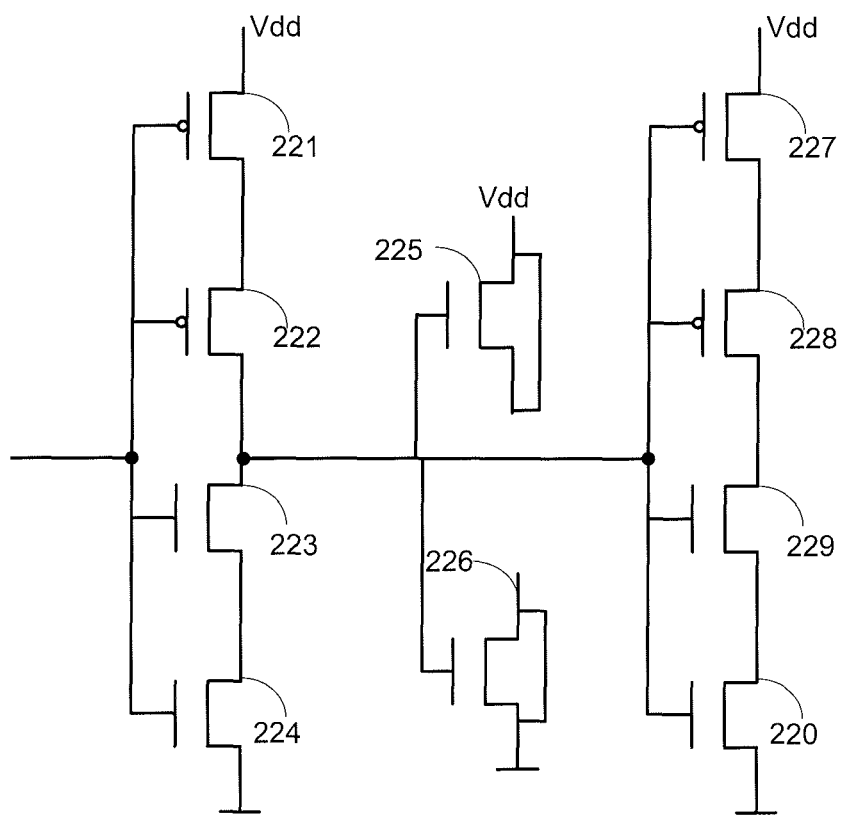
FIG. 2 schematically shows an example of an embodiment of a temperature sensitive delay cell.

FIG. 2 schematically shows an example of an embodiment of temperature sensitive delay cell 22.

Temperature sensitive delay cell 22 includes a first inverter and a pair of capacitors that are connected between the first inverter and a second inverter.

The first inverter includes first PMOS transistor 221, second PMOS transistor 222, first NMOS transistor 223, and second NMOS transistor 224.

First PMOS transistor 221, second PMOS transistor 222, first NMOS transistor 223 and second NMOS transistor 224 are serially connected to each other. The gates of all these transistors are connected to each other to form an input port of the first inverter. The drains of second PMOS transistor 222 and first NMOS transistor 223 are connected to each other to form an output port of the first inverter.

The output port of first inverter is connected to an input port of the second inverter and to two capacitors 225 and 226. First capacitor 225 is a PMOS transistor that its source and drain are connected to each other and to a voltage supply node. The gate of the PMOS transistor is connected to the output port of the first inverter.

Second capacitor 226 includes an NMOS transistor that its source and drain are connected to each other and to a ground node. The gate of the NMOS transistor is connected to the output port of the first inverter.

The second inverter includes third PMOS transistor 227, fourth PMOS transistor 228, third NMOS transistor 229, and fourth NMOS transistor 220.

Third PMOS transistor 227, fourth PMOS transistor 228, third NMOS transistor 229, and fourth NMOS transistor 220 are serially connected to each other. The gates of all these transistors are connected to each other to form an input port of the second inverter. The drains of fourth PMOS transistor 228 and third NMOS transistor 229 are connected to each other to form an output port of the second inverter.

A signal that arrives to the input node of the first inverter is inverted (and delayed) by first inverter to provide an inverted signal. This signal (depends upon its value) can charge or discharge the first and second capacitors. The second inverter changes its state in response to the inverter signal only after the inverted signal charges enough (by charging and discharging the first and second capacitors).

Figure 4:
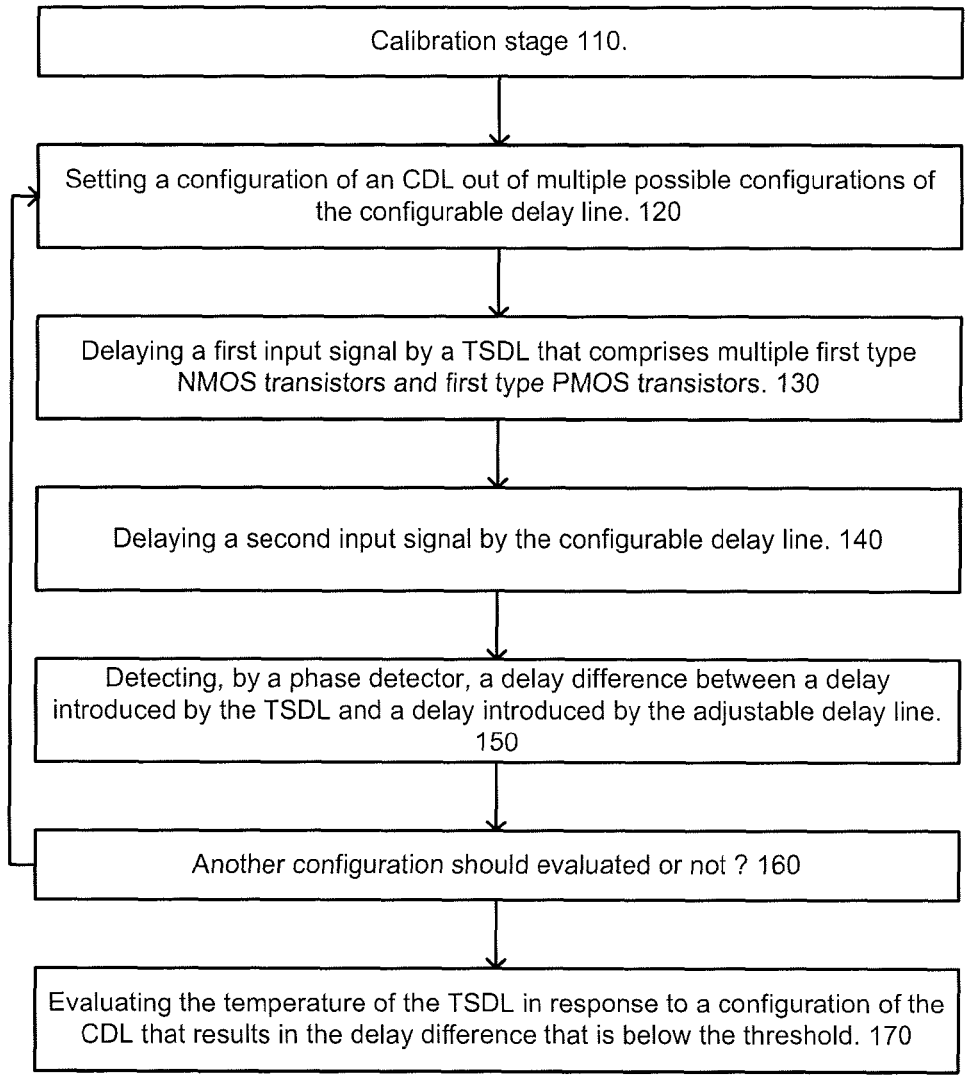
FIG. 4 schematically shows an example of an embodiment of a method for evaluating a temperature.

FIG. 4 schematically shows an example of an embodiment of method 100 for evaluating a temperature.

Method 100 for evaluating temperature starts by a calibration stage 110.

Stage 110 can include finding a reference configuration of the configurable delay line. The adjustable controller, once configured in the reference configuration and in a known temperature, introduces a delay that substantially equals a delay introduced by the temperature sensitive delay line.

Stage 110 is followed by stage 120 of setting a configuration of a CDL out of multiple possible configurations of the CDL.

Stage 120 can include setting the configuration of the CDL by selecting, out of multiple rough delay cells and out of multiple fine delay cells, multiple delay cells that participate in delaying the first input signal; wherein a rough delay cell introduces a delay that is much longer than the delay introduced by a fine delay element.

Stage 120 is followed by stage 130 of delaying a first input signal by a TSDL that comprises multiple first type NMOS transistors and first type PMOS transistors.

Stage 130 can include providing the first input signal to multiple delay cells, each delay cell comprises multiple large width CMOS transistors that form an inverter and a capacitor; wherein the delaying comprises charging or discharging the capacitor.

Stage 130 is followed by stage 140 of delaying a second input signal by the configurable delay line.

The CDL comprises second type NMOS transistors and second type PMOS transistors. These second type CMOS transistors can be Dual Gate Oxide transistors.

A process condition sensitivity of first type NMOS transistors and first type PMOS transistors substantially equals a process condition sensitivity of the second type NMOS transistors and second type PMOS transistors.

The CDL is less sensitive to temperature than the temperature sensitive delay line.

The second input signal can be delayed in relation to the first input signal. The delay between the first and second delay signals can be introduced by a temperature insensitive circuit. The delay can equal a minimal delay of the configurable delay line. Referring to the example of FIG. 3, this minimal delay is about 1.7 nanoseconds of a best case process scenario, is about 1.9 nanoseconds at a typical process scenario and about 2.25 nanoseconds at a worst case process scenario.

Stage 140 is followed by stage 150 of detecting, by a phase detector, a delay difference between a delay introduced by the TSDL and a delay introduced by the adjustable delay line.

Stage 150 is followed by control stage 160 that checks whether another configuration should be evaluated or not—whether the delay difference is above a threshold. If the answer is positive then stage 160 is followed by stage 120 in which the CDL is set to another configuration.

If the answer is negative (the delay difference is below a threshold) then stage 160 is followed by stage 170 of evaluating the temperature of the TSDL in response to a configuration of the CDL that results in the delay difference that is below the threshold.

Stage 170 can include determining a temperature of the TSDL by comparing between a current configuration of the CDL and the reference configuration, and applying a linear mapping between temperatures and configurations of the adjustable configurable delay line.

Figure 5:
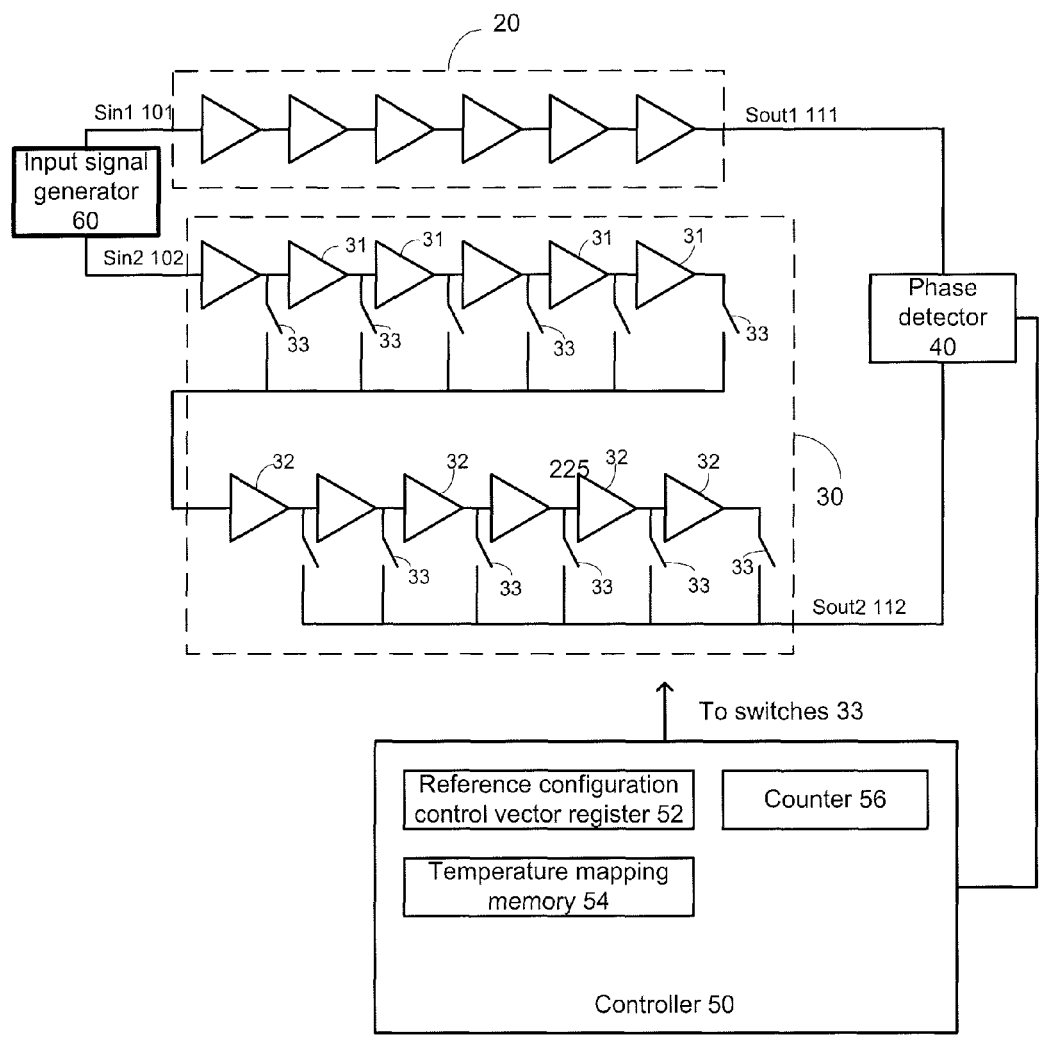
FIG. 5 schematically shows an example of an embodiment of a device that has temperature evaluating capabilities.

FIG. 5 schematically shows an example of an embodiment of device 11 that has temperature evaluating capabilities.

Device 11 includes input signal generator 60 that generates second input signal Sin2 102 by delaying first input signal Sin1 101. The delay can assists in reducing the overall delay introduced by CDL 20—as the latter is not required to be introduce a delay that is substantially equal to the entire delay introduced by TSDL 20. Input signal generator 60 can delay Sin1 101 by a delay that is responsive to a minimal delay introduced by TSDL 20. In this case the minimal delay introducing configuration of CDL 30 can substantially equal zero.

It is noted that device 10 can receive first and second input signals Sin1 101 and Sin2 102 from an external source, such as a tester.

Although the invention has been described with respect to specific conductivity types or polarity of potentials, skilled artisans appreciate that conductivity types and polarities of potentials may be reversed.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

However, other modifications, variations, and alternatives are also possible. The specifications and drawings are, accordingly, to be regarded in an illustrative rather than in a restrictive sense.

The word "comprising" does not exclude the presence of other elements or steps then those listed in a claim. It is understood that the terms so used are interchangeable under appropriate circumstances such that the embodiments of the invention described herein are, for example, capable of operation in other orientations than those illustrated or otherwise described herein.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

What is claimed is:

1. A method for evaluating temperature, the method comprises:

setting a configuration of a configurable delay line out of multiple possible configurations of the configurable delay line;

delaying a first input signal by a temperature sensitive delay line that comprises first type NMOS transistors and first type PMOS transistors;

delaying a second input signal by the configurable delay line;

wherein the configurable delay line comprises second type NMOS transistors and second type PMOS transistors;

wherein a process condition sensitivity of the first type NMOS transistors and the first type PMOS transistors substantially equals a process condition sensitivity of the second type NMOS transistors and the second type PMOS transistors;

wherein the configurable delay line is less sensitive to temperature than the temperature sensitive delay line;

detecting, by a phase detector, a delay difference between a delay introduced by the temperature sensitive delay line and a delay introduced by the configurable delay line;

repeating the setting, delaying of the first input signal, delaying of the second input signal and detecting, until the delay difference is below a threshold; and evaluating the temperature of the temperature sensitive delay line in response to a configuration of the configurable delay line that results in the delay difference that is below the threshold.

2. The method according to claim 1 comprising setting the configuration of the configurable delay line by selecting, out of multiple rough delay cells and out of multiple fine delay cells, multiple delay cells that participate in delaying the first input signal, wherein a rough delay cell introduces a delay that is much longer than the delay introduced by a fine delay element.

3. The method according to claim 1 wherein the delaying of the first input signal comprises providing the first input signal to multiple delay cells, each delay cell comprises multiple large width CMOS transistors that form an inverter and a capacitor, wherein the delaying comprises charging or discharging the capacitor.

4. The method according to claim 1 wherein the second input signal is delayed in relation to the first input signal by a delay that is responsive to a minimal delay introduced by the temperature sensitive delay line.

5. The method according to claim 4 comprising generating the second input signal by delaying the first input signal.

6. The method according to claim 1 comprising finding a reference configuration of the configurable delay line, wherein a controller, once configured in the reference configuration and in a known temperature, introduces a delay that substantially equals the delay introduced by the temperature sensitive delay line.

7. The method according to claim 6 comprising determining a temperature of the temperature sensitive delay line by comparing between a current configuration of the configurable delay line and the reference configuration, and applying a linear mapping between temperatures and configurations of the configurable delay line.

8. A method for evaluating temperature, the method comprises:

setting a configuration of a configurable delay line out of multiple possible configurations of the configurable delay line;

delaying a first input signal by a temperature sensitive delay line;

delaying a second input signal by the configurable delay line;

wherein the configurable delay line is less sensitive to temperature than the temperature sensitive delay line;

detecting, by a phase detector, a delay difference between a delay introduced by the temperature sensitive delay line and a delay introduced by the configurable delay line;

repeating the setting, delaying of the first input signal, delaying of the second input signal and detecting, until the delay difference is below a threshold; and evaluating the temperature of the temperature sensitive delay line in response to a configuration of the configurable delay line that results in the delay difference that is below the threshold.

9. The method according to claim 8 comprising setting the configuration of the configurable delay line by selecting, out of multiple rough delay cells and out of multiple fine delay cells, multiple delay cells that participate in delaying the first input signal, wherein a rough delay cell introduces a delay that is much longer than the delay introduced by a fine delay element.

10. The method according to claim 8 wherein the delaying of the first input signal comprises providing the first input signal to multiple delay cells, each delay cell comprises multiple large width CMOS transistors that form an inverter and a capacitor, wherein the delaying comprises charging or discharging the capacitor.

11. The method according to claim 8 wherein the second input signal is delayed in relation to the first input signal by a delay that is responsive to a minimal delay introduced by the temperature sensitive delay line.

12. The method according to claim 11 comprising generating the second input signal by delaying the first input signal.

13. The method according to claim 8 comprising finding a reference configuration of the configurable delay line, wherein a controller, once configured in the reference configuration and in a known temperature, introduces a delay that substantially equals the delay introduced by the temperature sensitive delay line.

14. The method according to claim 13 comprising determining a temperature of the temperature sensitive delay line by comparing between a current configuration of the configurable delay line and the reference configuration, and applying a linear mapping between temperatures and configurations of the configurable delay line.

15. A method for evaluating temperature, the method comprises:

setting a configuration of a configurable delay line out of multiple possible configurations of the configurable delay line;

delaying a first input signal by a temperature sensitive delay line;

delaying a second input signal by the configurable delay line;

wherein the configurable delay line is less sensitive to temperature than the temperature sensitive delay line;

detecting, by a phase detector, a delay difference between a delay introduced by the temperature sensitive delay line and a delay introduced by the configurable delay line; and evaluating the temperature of the temperature sensitive delay line in response to a configuration of the configurable delay line that results in the delay difference that is below a threshold.

16. The method according to claim 15 comprising setting the configuration of the configurable delay line by selecting, out of multiple rough delay cells and out of multiple fine delay cells, multiple delay cells that participate in delaying the first input signal, wherein a rough delay cell introduces a delay that is much longer than the delay introduced by a fine delay element.

17. The method according to claim 15 wherein the second input signal is delayed in relation to the first input signal by a delay that is responsive to a minimal delay introduced by the temperature sensitive delay line.

18. The method according to claim 17 comprising generating the second input signal by delaying the first input signal.

19. The method according to claim 15 comprising finding a reference configuration of the configurable delay line, wherein a controller, once configured in the reference configuration and in a known temperature, introduces a delay that substantially equals the delay introduced by the temperature sensitive delay line.

20. The method according to claim 19 comprising determining a temperature of the temperature sensitive delay line by comparing between a current configuration of the configurable delay line and the reference configuration, and applying a linear mapping between temperatures and configurations of the configurable delay line.

* * * * *